United States Patent [19]

Stoll

[11] Patent Number: 4,962,912
[45] Date of Patent: Oct. 16, 1990

[54] RATE OF FLOW CONTROL VALVE

[75] Inventor: Kurt Stoll, Esslingen, Fed. Rep. of Germany

[73] Assignee: Festo KG, Esslingen, Fed. Rep. of Germany

[21] Appl. No.: 410,865

[22] Filed: Sep. 21, 1989

[30] Foreign Application Priority Data

Oct. 1, 1988 [DE] Fed. Rep. of Germany ....... 3833494

[51] Int. Cl.$^5$ .......................... F16K 3/32; F16K 47/06
[52] U.S. Cl. .................................. 251/208; 251/129.11
[58] Field of Search ............................ 251/208, 129.11

[56] References Cited

U.S. PATENT DOCUMENTS

| | | | |
|---|---|---|---|
| 1,160,864 | 11/1915 | Vaughn | 251/208 X |
| 2,080,272 | 5/1937 | Hollman | 251/208 |
| 4,732,244 | 3/1988 | Verkuylen | 251/208 X |

FOREIGN PATENT DOCUMENTS

| | | | |
|---|---|---|---|
| 175767 | 6/1961 | Sweden | 251/208 |
| 673319 | 6/1952 | United Kingdom | 251/208 |
| 1458001 | 12/1976 | United Kingdom | 251/208 |

*Primary Examiner*—Arnold Rosenthal
*Attorney, Agent, or Firm*—McGlew & Tuttle

[57] ABSTRACT

The flow regulating valve for pneumatic or other fluids comprises a housing with two valve spaces separated from each other by a partition and each having a port opening into them. The two valve spaces are able to be connected with each other by a cutout or transfer port in the partition. In one valve space there is a rotary valve member which covers the transfer port to a greater or lesser extent in accordance with the amount it is turned. On adjusting the position of the rotary valve member the effective size of the transfer port may be varied to control the flow of the fluid between one valve space and the other.

7 Claims, 2 Drawing Sheets

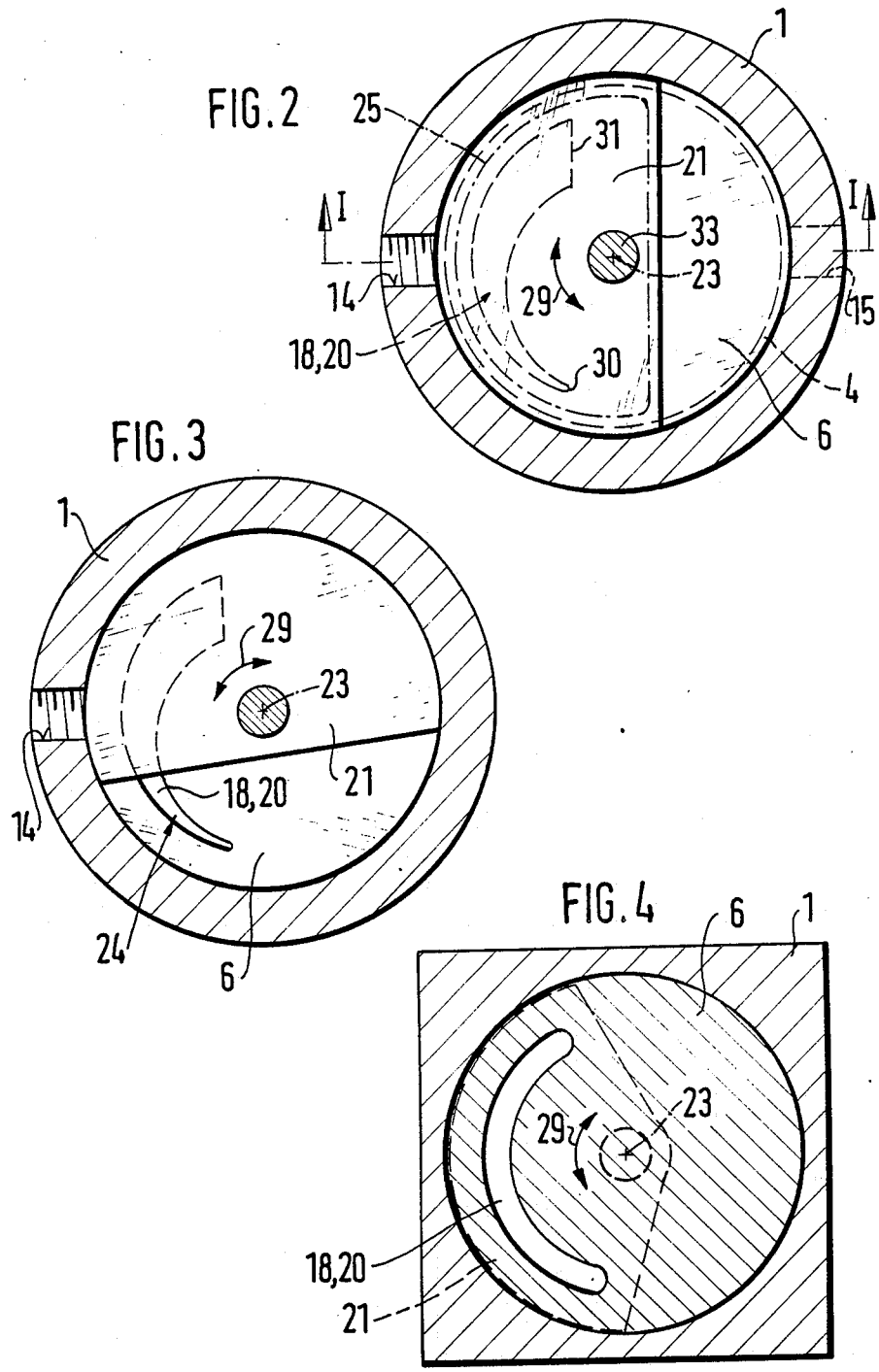

RATE OF FLOW CONTROL VALVE

BACKGROUND OF THE INVENTION

The invention relates to a rate of flow control valve more especially for gases, such as more especially compressed air.

SHORT SUMMARY OF THE INVENTION

One object of the invention is to devise a rate of flow control valve adapted to be fitted to equipment and which has a wide range of variation.

A still further aim of the invention is to provide such a valve which is still functionally reliable when used with contaminated fluid under pressure.

In order to achieve these or other objects the valve housing has an inlet port and an outlet port for the fluid under pressure and is divided up into two valve spaces separated from each other by a partition and communicating with one of the respective ports, said partition having a transfer port for the fluid between the two valve spaces in the form of a cutout in the partition so as to extend from one valve space to the other. A rotary valve member is arranged in one of the two valve spaces on the respective side of the partition and adapted for setting the desired rate of flow from one valve space into the other by turning such valve member in relation to the transfer port by an external force, such valve member being able to be turned between a closing setting completely covering the transfer port and an open setting uncovering the transfer port completely or in part.

Such a rate of flow control valve may be produced with a small number of components so that it may be manufactured at a low price and it has a low rate of wear. Furthermore it has a relatively large range of regulation it being possible to provide for a relatively large displacement between the settings for the highest rate of flow and the lowest rate thereof so that any desired intermediate values may be set stepless and sensitively. Since furthermore the flow path through the valve is relatively short through the portion there is very little tendency of the valve to become blocked and consequently trouble-free operation is possible.

Advantageous further developments of the invention are described in the claims.

In accordance with one development of the invention the rotary valve member is free of any opening at least in the part which is opposite the transfer port during possible rotation and is preferably free of any opening at all. This means that the rotary valve member may be in the form of simple plate or disk devoid of any opening therein and which in the closed setting covers the transfer port and in the open setting is pivoted or turned to a greater or lesser extent clear of the port. This means that it is not necessary for the rotary valve member to be provided with an opening so that there is a further reduction in costs of manufacture. Furthermore, this feature means that for transfer from one valve space to the other the fluid under pressure only has to flow through one component and thus only has to move a small distance. This leads to a reduction in frictional losses and increases the efficiency of the valve.

In order to still further facilitate manufacture and to simplify design on the side to the partition adjacent to the valve member there is a flat running surface on which the valve member runs in every rotational position thereof so as more particularly to make flat contact therewith at an interface, the axis of rotation of the rotary valve member more particularly being at a right angle to such flat contact interface.

Further possible features of the invention the transfer port may be designed to extend in the coaxial direction about the axis of rotation of the valve member for preferably less than 360°, said transfer port being so configured that along its length as measured in the direction of the curvature thereof it has a constant cross section or has a changing cross section with a continuous change therein along the length of the transfer port. The transfer port may be sickle-shaped and the rotary valve member is so designed that in a shut position it completely covers over the transfer port and in an open position beside the transfer port completely uncovers it. These features make it possible to ensure a particularly large range of variation of flow rate. The transfer port may be made very long in the direction of curvature in order to cause a change in the flow cross section by the addition or removal on the side of the covered longitudinal section of the transfer port. Thus in the position of maximum opening the entire cross section of the cutout is available for flow and not only a part thereof. Suitable configuration of the cross sectional form along the length of the transfer port may be another factor influencing regulation characteristics of the valve.

The invention will now be described in more detail with reference to the accompanying drawings.

LIST OF THE SEVERAL FIGURES OF THE DRAWING

FIG. 2 shows a cross section of the flow control valve taken on the line II—II in the shut position.

FIG. 3 shows the valve of FIG. 1 also in cross section on the line II—II but in a partly open setting thereof.

FIG. 4 shows a further embodiment of the rate control valve in cross section, the line of the section having a form corresponding to the line IV—IV shown in FIG. 1.

DETAILED DESCRIPTION OF EMBODIMENTS OF THE INVENTION

Figure 1:
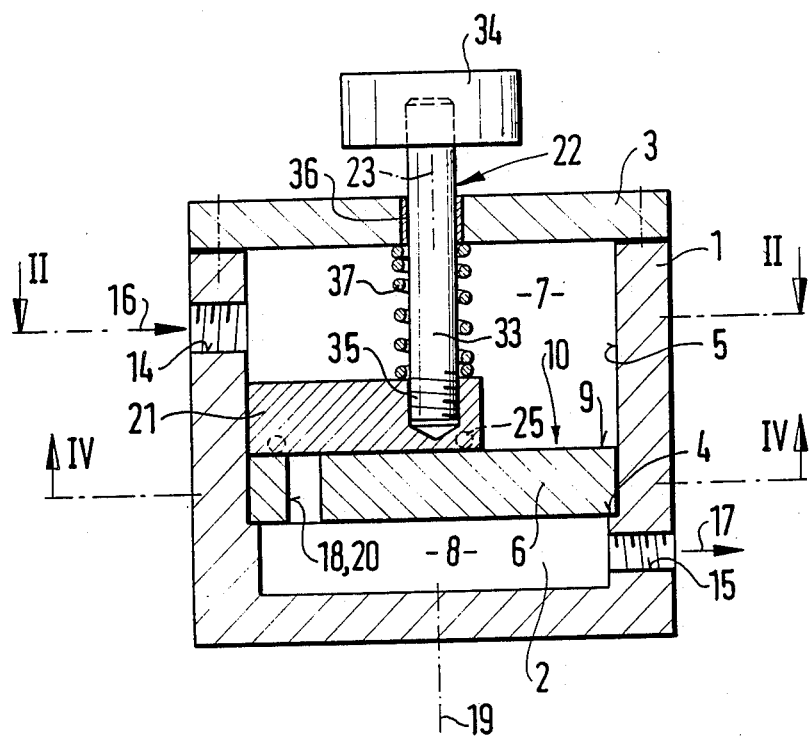
FIG. 1 shows a first form of construction of the flow control valve in accordance with the invention in the form of a longitudinal section taken on the line I—I of FIG. 2.

The embodiment of the flow rate controlling valve shown in FIGS. 1 through 3 comprises a housing 1 with a cylindrical outer form. A cavity 2 is present inside it which is totally enclosed by the walls of the housing, one end housing wall being formed by a housing cover 3. The cavity 2 also has the form of a circular cylinder and has two consecutive sections of different diameter with an annular shoulder 4 between them. The section 5 with the larger diameter is associated with the housing cover 3.

The cavity 2 is subdivided by a partition 6 into two valve spaces 7 and 8. This partition 6 has an outer form which is complementary to the cavity 5 with the larger size and is seated in this section 5 so as to rest on the shoulder 4. In this manner it is positioned on the partition 6. Thus the partition 6 may be readily inserted when the housing cover 3 is removed. There is a seal between the peripheral part of the partition 6 and the housing 1, this being effected in the embodiment by adhesive between the partition 6 and the housing 1. It is obviously also possible to have a separate gasket in addition or, as an alternative, to this adhesive.

The partition 6 has the configuration of a circular disk with preferably plane disk surface 9, more particularly on the top side 10 of the wall facing the valve space 7 adjacent to the cover.

An inlet port 14 opens into the valve space 7 on the cover side and an outlet port 15 communicates with the valve space 8 at the bottom side of the housing. As indicated by the arrow 16 fluid under pressure may pass through the inlet port 14 to the valve space 7, whereas via the outlet port 15 pressure fluid may escape from the valve space 8 as indicated by the arrow 17. Pressure fluid lines, which are not illustrated, may be connected with the ports. As indicated in the figure, the ports are preferably arranged in the encircling or circumferential side wall of the housing 1. The regulating valve is suitable for operation with gas under pressure such as compressed air.

The partition 6 is provided with a cutout 18, which opens into the valve space 7 and 8 at its two ends and extends through the partition 6 in the axial direction 19 in relation to the housing 1. It constitutes a transfer port 20, via which the gas under pressure may make its way from the upper valve space 7 into the lower valve space 8, if such transfer port is at least partly open.

In the inlet flow valve space 7 there is a rotary valve member 21 which makes flat contact with the associated surface 9 of the partition 6 and may be turned about an axis 23 by an operating member 22 from the outside of the housing. Dependent on the instantaneous angular setting the transfer port 20 is covered over by the rotary valve member 21 to a greater or lesser extent so that the size of the flow cross section 24 is adjusted by the rotary valve member available for transfer between the two valve spaces 7 and 8 and the area not covered by the such valve member may be varied as required. As will be readily seen from a comparison between the two FIGS. 2 and 3, the rotary valve member 21 may assume a closed setting (FIG. 2) in which the transfer port 20 is completely covered by it. On the other hand it may also assume open settings, in which it completely or partially covers over the transfer port 20 so as to set a larger or smaller flow cross section 24. In FIG. 3 one such partly open setting will be seen. In the working example of the invention shown the axis 23 of rotation coincides with the longitudinal axis 19 of the housing 1 and is placed at a right angle to the partition surface 9 forming the one running surface for the rotary valve member 21. As a result the rotary valve member 21 will make contact over a large area with the partition 6 whatever its angular setting. In the working example there is no provision of a separate seal member in the area of engagement between the rotary valve member 21 and the partition 6, since a sufficient sealing effect may be achieved by the use of soft plastic, too given an example of one possible material, However, it is quite feasible to provide a seal in this region in addition to relying on the mating contact of the running surfaces. Such an additional seal is marked in broken lines in FIG. 2 at 25. It is expedient for such a seal to take the form of an annular seal, which is so arranged on one of the two parts that in the closed setting of the rotary valve member 21 the transfer port 20 is surrounded thereby in the zone of the opening leading into the valve space 7.

In the working example the rotary valve member 21 also has the form of a disk. However, for reasons yet to be explained, it does not in fact have a circular outline, although the disk-like design of the partition 6 and of the rotary valve member 21 ensure a compact overall size of the valve as measured in the axial direction 19.

The working example of the invention does involve one particularly valuable advantage, that is to say that the transfer port 20, as seen in the direction of the axis 23 of rotation, has a curved form. It extends in an arcuate manner in the peripheral direction 29 in relation to the axis of 23 of rotation and thus is relatively elongated. In this respect its peripheral extent is somewhat less than 360°.

In the case of the illustrated, preferred working example of the invention the transfer port 20 subtends an angle of arc of somewhat less than 180°. The center of curvature coincides substantially with the axis 23 of rotation. In this respect the rotary valve ember 21 is so designed that it completely shuts off the transfer port 20 in the closed position, while in order to obtain the maximum open setting it may be so turned around the axis 23 that it completely frees the transfer port 20 and takes up a position alongside it. This involves the advantage that the rotary valve member 21 may itself be fashioned without any opening at all so that there is no flow through it as well as through the partition in any one of its possible settings. The transfer of medium under pressure between the two valve spaces 7 and 8 thus takes place entirely and exclusively via the transfer port 20. This leads to the advantage that the rotary valve member 21 may be simple in design and does not have to have any port therethrough adapted to the configuration and extent of the transfer port 20.

It is particularly expedient if the rotary valve member 21, as seen in the longitudinal direction 23, has the form of a segment of a circle subtending an angle in excess of 180°. This is in fact the case in FIGS. 2 and 3 and it will be seen that the center of curvature of the rotary valve member 21 coincides with the axis 23 of rotation. Preferably the outline of the rotary valve member 21 in its curved part is the same as that of the partition 6 so that the two parts are coaxially arranged.

On turning the rotary valve member 21 about the axis 23 of rotation the rotary valve member 21 will be gradually twisted clear of the transfer part 20, the length of the opened part, that is to say of the flow cross section 24, will steadily increase. The maximum open setting will be reached after twisting through about 180°.

As considered along its curvature in the working example of FIGS. 1 through 3 the transfer port 20 has a continuously changing cross section. Starting at a minimum value at one circumferential end 30 there is a steady increase in the width of the cutout in the circumferential direction 29 in order at the other end 31 to attain a maximum value. As seen in plan view the transfer port has the form of a sickle or crescent. It is in this manner that it is more particularly possible to achieve a proportional characteristic of the valve, this considerably simplifying its operation.

In the working embodiment the operating member 22 is made up of a shaft 33 and a rotary knob 34. The longitudinal axis of the shaft 33 coincides with the axis 23 of rotation and the shaft 33 is attached to the rotary valve member 21 in a manner preventing relative rotation, for instance by having a screwed join 35. The shaft 33 extends through the valve space 7 on the inlet side in the longitudinal direction and also extends to the outside through the housing cover 3, in which it is able to be turned in a gland 36. It is also possible to provide additional bearing means which are not shown. The rotary knob 34 is attached to the outer part of the shaft and when it is turned it is possible for the rotary valve member 21 to be turned in a corresponding manner.

The necessary loading force between the rotary valve member 21 and the partition is in the present working example provided by a compression spring 37, which surrounds the shaft 22 coaxially in the valve space 7 and has its one end bearing on the housing cover 3 and the other on the side, facing away from the partition 6, of the rotary valve member 21.

It will be apparent that the partition 6, the rotary valve member 21 with the shaft 33 already fitted in it and the compression spring 36 may be simply placed in the cavity 2 after the housing cover 3 has been removed. And then the cover 3 may be slipped onto the shaft 33 and screwed to the housing 1 so as to make sealing contact therewith. The assembly of the valve is thus very simple.

In the illustrated working embodiment the center of the rotary motion of the rotary valve member 21 is mainly due to its circular outline, which runs with a sliding fit on the inner periphery of the larger cavity section 5. It will however by clear that other bearing means may be provided for, as for instance a direct connection between the rotary valve member 21 and the partition by a bearing shaft. Such a means is more particularly suitable if the peripheral extent of the rotary valve member 21 as measured about the axis 23 is less than 180°. In such a case, as illustrated in the example of FIG. 4, the rotary valve member 21 has the form of a sector of a circle. In this case as well the extent of the transfer port 20 as measured in the direction of rotation is smaller. This embodiment also has a transfer port 20, which has a constant cross section along its full length as measured in the peripheral direction 29 about the axis 23 of rotation. Further in this working example of the invention of FIG. 4 the housing has a square outer form.

It will be clear that the invention also functions when the outlines of the rotary valve member 21 and of the partition 6 are different. Furthermore these outlines do not necessarily have to be rounded. It is however an advantage if the area of the rotary valve member 21 as seen in the longitudinal direction of the axis 23 of rotation is less than the area of the partition so that the rotary valve member 21 may be readily turned to the side of the transfer port 20 to open it.

In accordance with a further embodiment of the invention the rotary valve member may be turned by an electric stepper motor for instance, for example in steps.

What is claimed is:

1. A flow rate regulating valve, comprising:
    a housing having an inlet port and an outlet port for the fluid pressure,
    a partition separating the cavity of the housing into two valve spaces each communicating with one of the respective ports,
    said partition having a transfer port for the fluid to flow between the two valve spaces in the form of a cutout in the partition so as to extend from one valve space to the other, and
    a rotary valve member arranged in one of the two valve spaces on the respective side of the partition and adapted for setting the desired rate of flow from one valve space into the other by turning such valve member in relation to the transfer port by an external force, such valve member being able to be turned between a closed setting completely covering the transport port and an open setting at least partly uncovering the transfer port, said rotary valve member providing a substantially continuous surface facing said transfer port in said closing setting, said continuous surface being free of any opening at least in a part which may be passed over the transfer port, said transfer port extending in a peripheral direction, with respect to axis of rotation of said rotary valve member of less than 360° and defining a curved length with a cross section which continuously varies along said curved length, said continuous surface of said rotary valve member completely covering said transfer port in said closed setting and said continuous surface being positioned laterally adjacent said transfer port in said open setting to allow fluid to freely pass through said transfer port, said rotary valve member running on said partition and being in the form of a segment of a circle having a center coinciding with a center of said partition, said rotary valve member having an axis of rotation extending through said center, said segment of a circle having an outer periphery with an arc length greater than 180°.

2. The flow rate regulating valve as claimed in claim 1 wherein a side of the partition adjacent to the valve member is in the form of a flat running surface on which the valve member is able to run and said valve member is adapted to abut this running surface, more particularly over a large area, the axis of rotation of the rotary valve member being preferably set at a right angle to the running surface.

3. The flow rate regulating valve as claimed in claim 1 wherein the transfer port has a crescent-shaped outline.

4. The flow rate regulating valve as claimed in claim 1 wherein the peripheral extent of the rotary valve member as measured about the axis of rotation is less than 360°.

5. The flow rate regulating valve as claimed in claim 1 wherein the rotary valve member is in the form of a disk so that on the side thereof facing away from the partition, which also preferably in the form of a disk, it has a smaller disk area.

6. The flow rate regulating valve as claimed in claim 1 wherein the rotary valve member is biased by spring force onto the partition preferably a compression spring located between the rotary valve member and the housing inner face valve member side opposite to the partition.

7. The flow rate regulating valve as claimed in claim 1 wherein the rotary valve member is able to be set for instance by means of an electrical stepper motor.

* * * * *